United States Patent [19]
Levington

[11] 4,343,517
[45] Aug. 10, 1982

[54] HYDRAULIC BRAKING SYSTEMS FOR TRACTOR-TRAILER COMBINATIONS

[75] Inventor: Henry J. Levington, Snelland, England

[73] Assignee: Clayton Dewandre & Company Limited, Lincoln, England

[21] Appl. No.: 123,641

[22] Filed: Feb. 22, 1980

[30] Foreign Application Priority Data

Feb. 23, 1979 [GB] United Kingdom ............ 796416

[51] Int. Cl.$^3$ ............................................. B60T 13/68
[52] U.S. Cl. .................................................. 303/7
[58] Field of Search ................................. 303/7, 10, 11

[56] References Cited

U.S. PATENT DOCUMENTS 3,836,205  9/1974  Schwerin .............................. 303/7
3,912,334  10/1975  Schwerin et al. ...................... 303/7

*Primary Examiner*—Duane A. Reger

*Attorney, Agent, or Firm*—Leblanc, Nolan, Shur & Nies

[57] ABSTRACT

A hydraulic braking system for agricultural tractor-trailer combinations, taking hydraulic power from a pump on the tractor. The system includes a pressure control valve movable by the main hydraulic service supply to connect the main supply with a chamber in communication with a restricted bore and an outlet for the by-passed braking fluid. A pilot valve responsive to braking pressure, or manually operable, admits fluid to the trailer brakes and operates a check-valve closing a connection between the chamber and a return line for fluid not required for braking. The check valve enables a clean switching action and eliminates any tendency to meter at some intermediate pressure. Both constant flow and constant pressure systems are described. The return line may be connected to a low pressure sink or to the flow at the services outlet port preferably via another check valve.

10 Claims, 12 Drawing Figures

HYDRAULIC BRAKING SYSTEMS FOR TRACTOR-TRAILER COMBINATIONS

This invention relates to hydraulic braking systems for tractor-trailer particularly agricultural tractor-trailer, combinations in which the trailer braking circuit takes hydraulic power from a pump on the tractor.

The invention provides a hydraulic braking system of this kind, comprising a pressure control valve having a spool which is movable by the main hydraulic service supply to the trailer to connect the main supply to a services outlet port, and which has a restricted bore affording a flow-path for braking fluid by-passed from the main supply, and a pilot valve responsive to the braking pressure in the vehicle brake circuit or manually operable to admit braking fluid under pressure to the trailer brakes. The braking fluid by-passed from the main hydraulic service supply to the trailer, is returned to the downstream supply line unless required for brake operation. Thus very little power is lost although, at the expense of losing more power, the system may be made less costly. In the following, both flow-loss and no-loss systems will be described.

Hydraulic braking systems according to this invention fall into two general classes namely constant flow systems and constant pressure systems.

In the former case, a constant flow of hydraulic fluid is supplied to the trailer brake circuit (the constancy of flow depending upon the tractor engine speed) and the braking pressure is built up by restricting that flow. No energy storage is possible with this form of system and no braking pressure is available if the engine is stopped. Pressure to the trailer brakes is raised under control of the pilot valve and demands an equivalent pressure level from the supplying pump, throughout application of the brakes. The supplying pump can however, be off loaded to supply other apparatus on the tractor without imposing an equivalent high pressure on the supplying pump once the braking pressure has reached the desired level, using a pilot-operated check or non-return valve. This enables a clean switching action and eliminates any tendency to "meter" at some intermediate pressure.

A constant pressure system uses a pressure regulator which relays output pressure, proportional to the input force on the control spool, from a charged hydraulic accumulator or other nominally constant pressure source. Energy storage by means of the accumulator enables a limited number of brake applications after the tractor engine stops. In this case also, a pilot operated check valve can be used to control the charging of the accumulator and the brake pressure is then controlled by a pressure regulating valve from the nominally constant pressure source of the accumulator. What is proposed, therefore, in accordance with the present invention is a hydraulic braking system for tractor-trailer combination, which may be either a constant flow or a constant pressure system, in which the trailer braking circuit is supplied with hydraulic power from a pump on the tractor, comprising a pressure control valve having a spool which is movable by the main hydraulic service supply to the trailer, to connect the main supply to a service outlet port, and which has a restricted bore affording a flow path for braking fluid by-passed from the main supply and a chamber in communication with the restricted bore and with an outlet for the by-passed braking fluid under pressure, a pilot valve responsive to the braking pressure in the tractor brake circuit or manually operable to admit braking fluid under pressure to the trailer brakes, a return line for the by-passed fluid not required for braking, and a pilot operated check valve closing a connection between the said chamber and the return line. The return line may be connected to a low pressure sink or, to reduce power losses, via a check valve to the flow at the services outlet port of the pressure control valve.

The pilot valve is extremely carefully made to eliminate stray leakages which would cause the system to oscillate or hunt around the desired pressure.

Other features of the present invention are set forth in the appendent claims.

Embodiments of the present invention will now be described by way of example with reference to the accompanying drawings of which:

In all of the systems to be described, the trailer brake system may either be manually operated by the tractor driver completely independently of the tractor brakes, or be operated automatically be sensing the brake force level in the tractor braking system to provide a proportional braking level at the trailer brakes.

None of the drawings show details of, or connections with the brakes, pressure source, brake pedal linkage or the source of control pressure representative of the braking force, and other parts of the hydraulic circuit on the tractor, since these parts of the systems are all conventional and known to those skilled in the art. They are indicated throughout by reference letter B, P, F or E, and C respectively.

Figure 1:
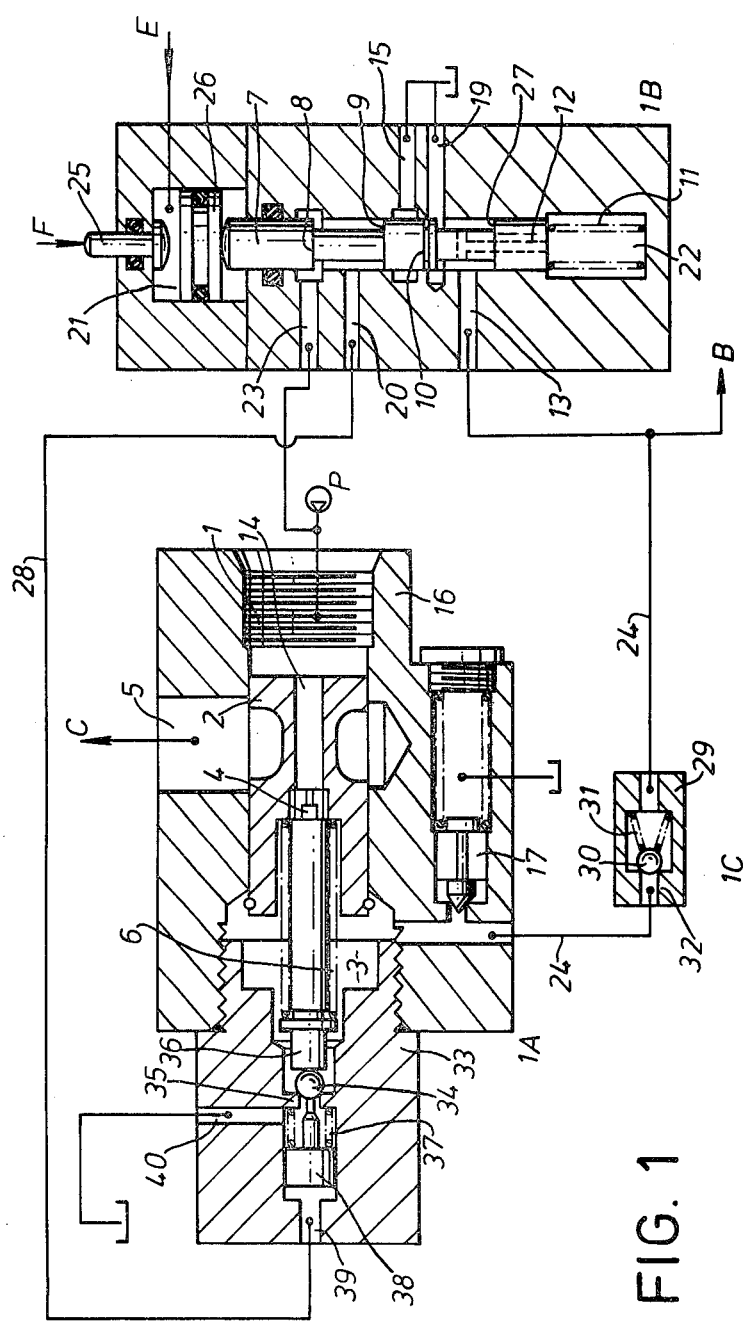
FIG. 1 is a diagram of a constant flow hydraulic braking system according to this invention including a pressure control valve (1A) and pilot valve (1B) in which the supply pressure is off loaded once the braking pressure has reached a required level.
Figure 2:
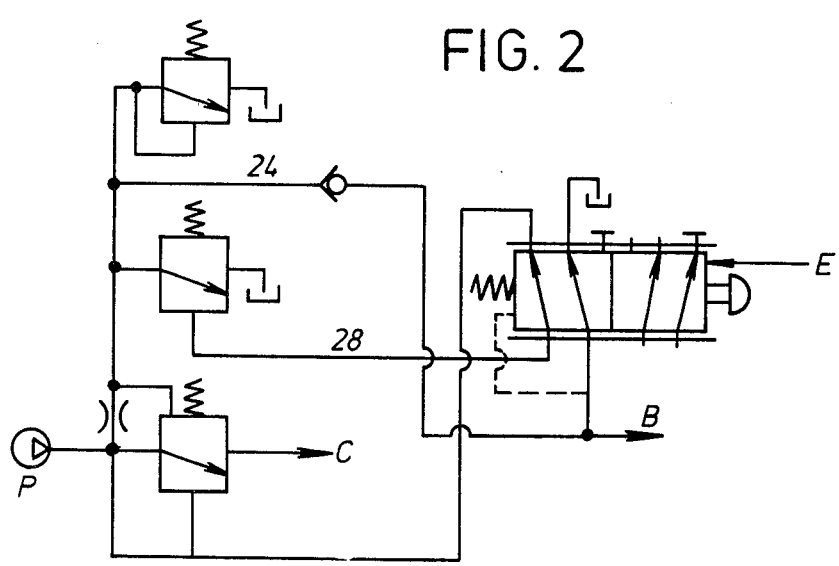
FIG. 2 is a hydraulic circuit diagram of the system shown in FIG. 1.

A constant flow system which controls braking pressure levels so as to retain the pressure level but allow the supplied flow to pass on to other apparatus without imposing an equivalent high pressure on the supplying pump is shown in FIGS. 1 and 2. In this system there are flow losses i.e. there is a constant leakage of maximum brake flow to the return line.

Pressure fluid is supplied from source P which is a pump on the tractor, to port 1 of the control valve assembly and acts upon spool 2 to move it to the left so allowing the fluid to flow out through port 5 to other parts of the tractor hydraulic circuit 8. A proportion of the flow entering at 1 bypasses through the centre of the spool 2 through a bore 14 and restriction 4, into chamber 3 and the pressure in port 1 is a function of the pressure in that chamber. If fluid cannot escape from chamber 3 the pressure in port 1 rises to the relief pressure of the source P.

The system shown is arranged with line 24 connecting chamber 3 to the brakes at B and to the pilot valve through port 13. A check valve 1C is interposed in line 24 allowing flow in one direction only; from valve 1A to the brakes B and valve 1B. Chamber 3 is also connected to the low pressure return line through a pilot operated check valve housed in cap 33 the action of which is controlled by lands 8 and 9 of the pilot valve assembly 1B.

Spring 6 has the dual function of urging spool 2 to the right and ball 34 on to the sealing seat 35 through spacer 36 thus sealing chamber 3 from the low pressure return line. To lift ball 34 from seat 35, to lower the pressure in chamber 3 to the return line pressure, plunger 38 is moved to push ball 34 to the right against springs 6 and 37, and any pressure in 3 is then connected to port 40. Plunger 38 is moved by pressurising port 39 to a level approximately equal to the pressure in port 1, the area presented by plunger 38 to pressure in port 39 being greater than the area of seat 35 by an amount sufficient to ensure that ball 34 is always moved to the right. Pressure in port 39 is controlled by spool 7 of the pilot valve. In the position shown, with the spool lifted to the "brake-off" position by spring 11, port 39 is connected to the pressure source P through port 23, across land 8, through port 20 and connecting conduit 28. Thus in the position shown chamber 3 would be at low pressure. When spool 7 is moved downwards to apply the trailer brakes (by force F or pressure from E in chamber 21) land 8 closes the connection between P and port 39 and connects that port to the low pressure return across land 9, thus causing ball 34 to seal on seat 35 and pressure to rise in chamber 3 and in the trailer brakes at B. The downward movement of spool 7 causes land 10 to close the connection of the brake line to low pressure return through port 13, the "timing" of the spool lands being such that land 10 closes before land 8 closes and land 9 opens. Pressure in brakes B and port 13 is transmitted to chamber 22 by drillings 12 in spool 7 and that pressure reacts on the area of spool 7 to produce a force balance on the spool. When balance occurs land 8 opens and land 9 closes pressurising port 39 and lowering the pressure in chamber 3. Conduit 24 becomes depressurised but check valve 3C retains the pressure in brake B. Land 10 on spool 7 remains overlapped with the valve body and seals port 13 from the low pressure return line through port 19.

Pressure in the brakes B is retained until spool 7 is allowed to move upwards, by reducing force F or lowering pressure in 21, sufficiently for land 10 to allow fluid to flow from brakes B to port 19. If pressure in the brakes B is not high enough, the force on the spool from F or pressure in 21 becomes higher than the reaction force on the spool due to the brake pressure and the spool moves downwards to repeat the sequence of raising pressure in chamber 3.

The normal operation of valve 1A is such that spool 2 restricts flow between port 1 and port 5, the pressure in port 1 being a function of the pressure in port 5, the spring 6, the pressure in chamber 3 (connected to port 1 via orifice 4) and the reaction forces on spool 2 due to the flow from port 1 to port 5. With low pressure in chamber 3 the pressure difference between port 1 and port 5 is a minimum (minimised by careful design to reduce parasitic losses in the system) and restricting the flow out of chamber 3 causes the pressure to rise and causes spool 2 to move to the right to restrict flow between ports 1 and 5 thus increasing the pressure difference between them. The switch action of the pilot operated check valve minimises metering effects and gives a rapid rate of pressure rise in chamber 3 even when the size of orifice 4 is minimised.

If pressure in the tractor hydraulic circuit C is higher than that required for the brakes B closing the pilot operated check valve by operation of the pilot valve 1B causes the pressure to tend to rise rapidly in chamber 3 which could cause the brake pressure to overshoot the required level. However if orifice 4 is relatively small the flow to the brakes is low and the pressure build-up time is sufficiently long to avoid excessive overshoot.

It follows that the system develops pressure in the brakes B at a level set by the maximum force applied to spool 7 (or as limited by relief valve poppet 17) and when that level is reached the supply pressure in chamber 3 is reduced to return line pressure and hence the supply system is unloaded or, if pressure in port 5 is higher than braking pressure, not loaded above the level set by other apparatus in the hydraulic system.

To ensure an absolute limit on braking pressure level poppet valve 17 is included in valve assembly 3A to limit pressure in chamber 3 to that set by the spring force acting on poppet 17 and the area of the seat on which 17 seals.

Figure 3:
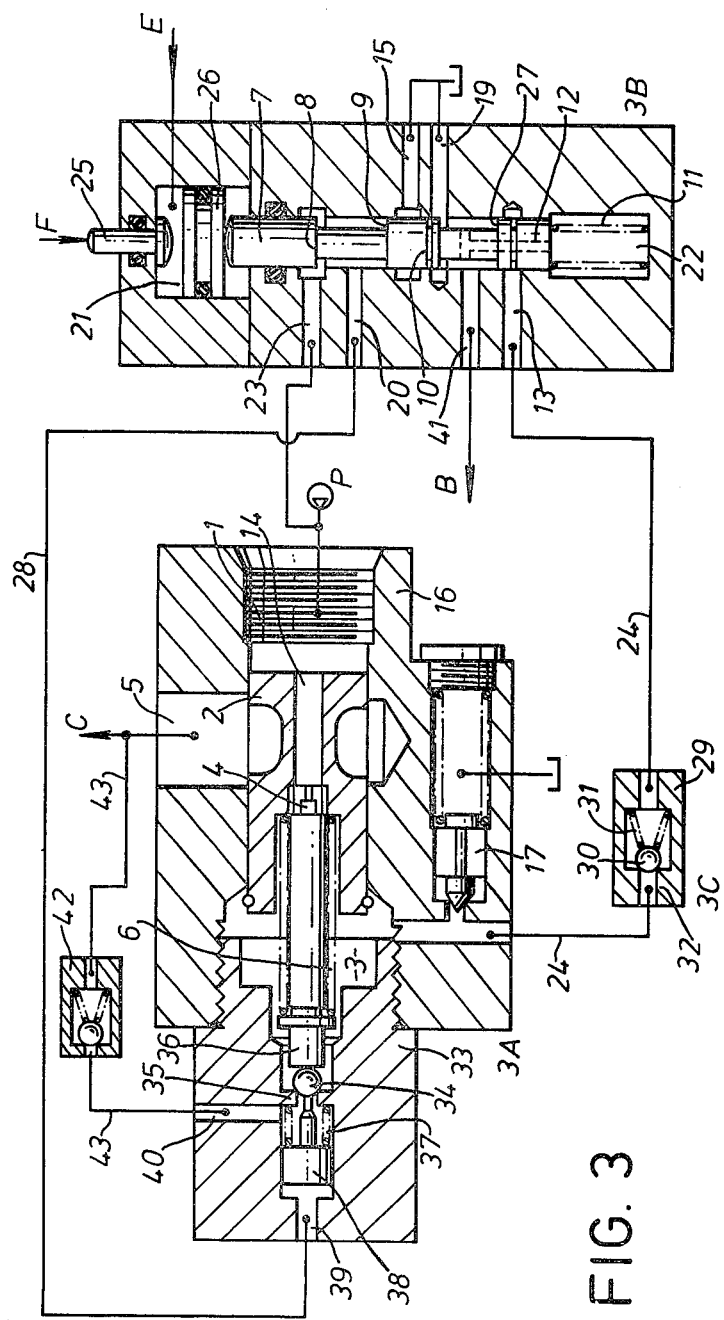
FIG. 3 is a system similar to the system of FIG. 1 but in which there are no flow losses.
Figure 4:
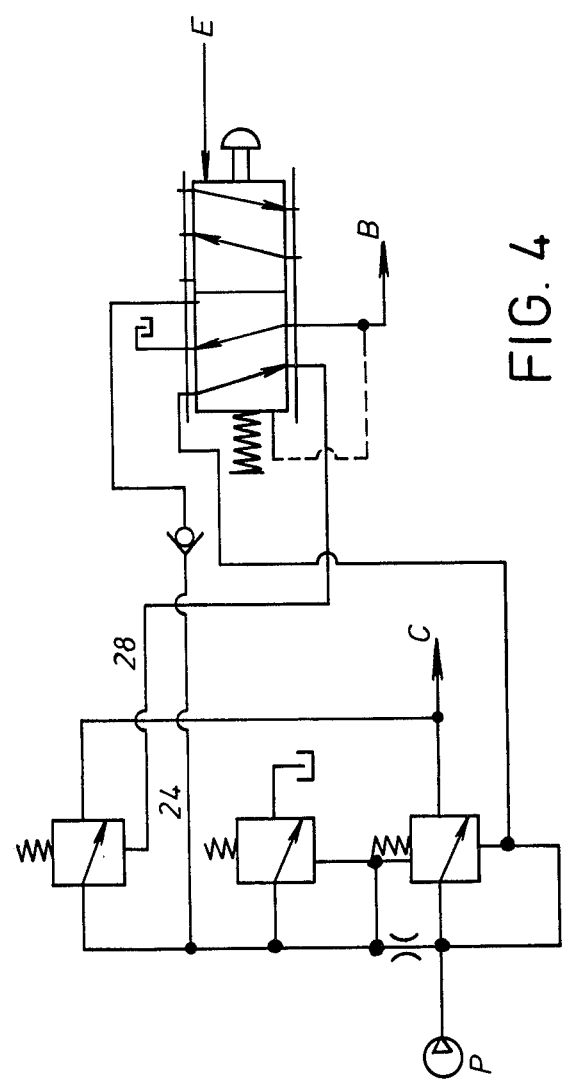
FIG. 4 is a hydraulic circuit diagram of the circuit shown in FIG. 3.

The system of FIGS. 3 and 4 function as that illustrated in FIGS. 1 and 2 except that port 40 is connected to port 5 by conduit 43 and the outlet of valve 3C does not connect directly to brakes B. The effect of this is to cause chamber 3 to become virtually the same pressure as that in port 5 when ball 34 is lifted from its seat 35. A non-return check valve 42 is included in the conduit 43 to stop fluid flowing from port 5 to chamber 3 in order to allow the braking pressure limiting valve poppet 17 to function when the limiting pressure is below the maximum pressure attained in port 5.

The function of the pilot control valve (3B) is similar to that of (1B-FIG. 1) except that a further control land 27 is included to isolate the pressure in chamber 3 from the brakes B when the valve is in the "brakes off" position. That is spool 7 pushed upwards by spring 11. The brakes are connected to port 41 which in the "off" position is connected to port 19 and low pressure return, across land 10.

The valve controls the pilot operated check valve 33 as previously described with land 10 closing the connection between the brake line and low pressure return, that land closing before lands 8 and 9 cause the pilot operated check valve 33 to reseat the check valve ball and cause pressure to rise in chamber 3. As land 10 closes so land 27 is caused to open port 13 to port 41, the two lands functioning simultaneously or land 27 opening just before land 10 closes. Brake pressure B is transmitted to chamber 22 via drillings 12 to cause that pressure to react on the end of spool 7 and against the input force on the spool.

If pressure in port 5, reflected in chamber 3, is below the braking pressure required the braking pressure is limited by lands 8 and 9 operating check valve 33 (to reduce pressure in chamber 3) when the forces on spool 7 balance. The check valve (3C) retains pressure in the braking circuits.

If pressure in port 5 and reflected in chamber 3, is higher than the braking pressure required, then lands 8 and 9 do not function and the closing of land 10 and opening of land 27 control the pressure in the brakes, spool equilibrium occurring when the interaction of the lands creates the required braking pressure level.

Figure 5:
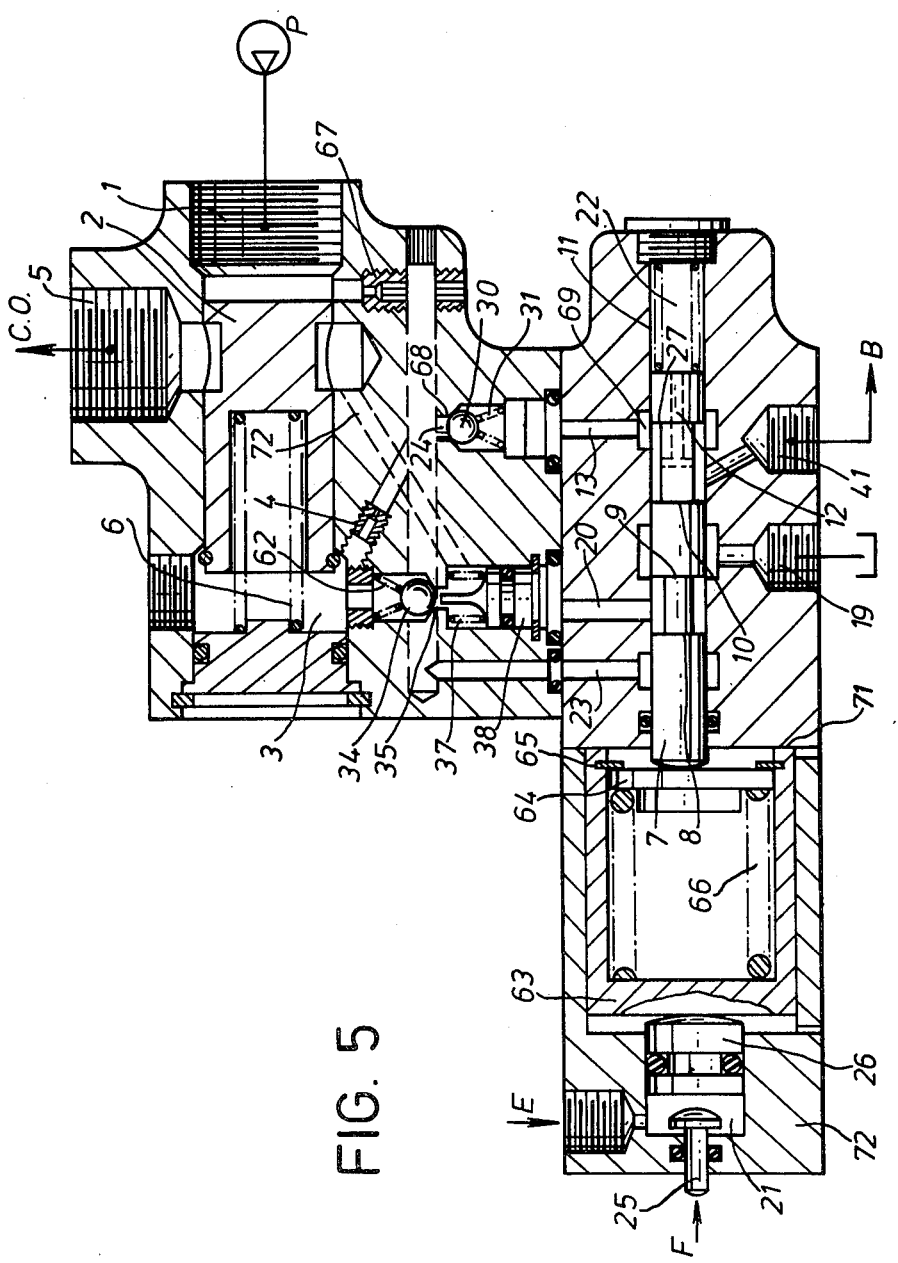
FIG. 5 is a diagram of a preferred embodiment of a constant flow hydraulic braking system in which there are no flow losses.
Figure 6:
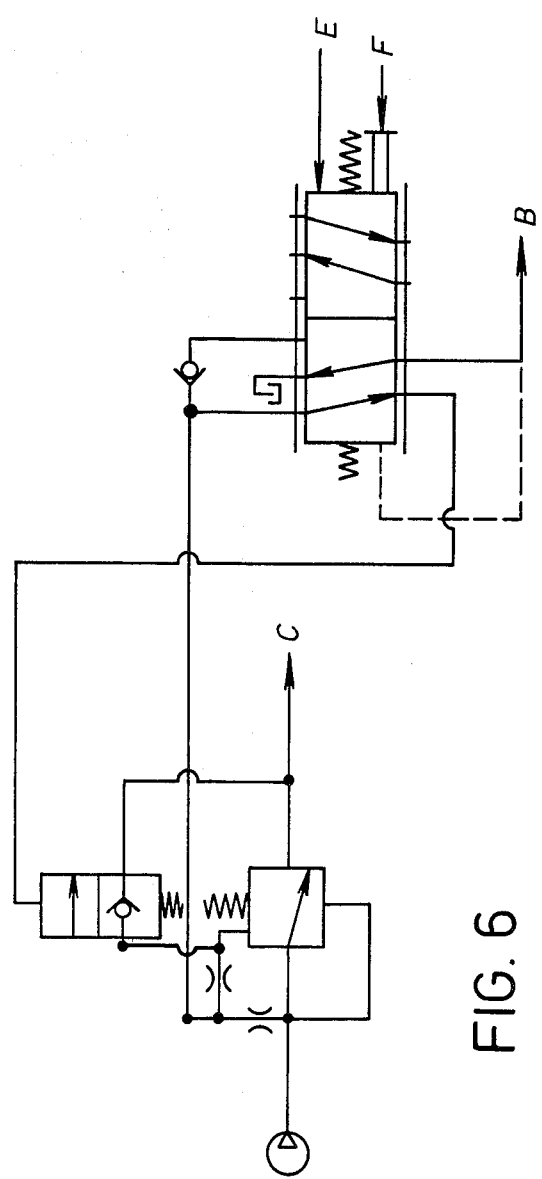
FIG. 6 is a hydraulic circuit diagram of the system of FIG. 5.

With reference now to the embodiment of FIGS. 5 and 6, in which the various valves are fitted together to form a control valve assembly fluid is supplied from source P, to port 1 of the control valve assembly and acts upon spool 2 tending to move it to the left so allowing the fluid to flow out through port 5 as indicated by arrow C. Part of the flow entering at 1 passes through orifice 67 and thence through orifice 4 into chamber 3 and the pressure in port 1 is proportional to the pressure in that chamber. If fluid cannot escape from chamber 3 spool 2 cannot move to the left and the pressure in port 1 rises to the relief pressure of the source P.

The system shown is arranged with line 24 connecting the downstream side of orifice 67 to the pilot valve through port 13. The check valve ball 30, seating on edge 68 and urged by spring 31, and which may be constructed with a cone pointed shuttle or flat disc is interposed in line 24 allowing flow in one direction only; to the pilot valve annulus 69. Chamber 3 is also connected to port 5 through a pilot operated check valve and conduit 72, the action of which is controlled by lands 8 and 9 of the pilot valve. Ball 34 seals on seat 35 urged by spring 62 and the pressure differential between chamber 3 and port 5.

To lift ball 34 from seat 35, so equalising the pressures in chamber 3 and port 5, plunger and piston 38 is moved to push ball 34 against spring 37. Plunger 38 is moved by pressurising port 39 to a level approximately equal to the pressure in port 1, the area presented by plunger 38 to pressure in port 39 being greater than the area of seat 35 by an amount sufficient to ensure that ball 34 is always moved away from seat 35. Pressure in port 39 is controlled by spool 7 of the pilot valve. In the opposite position to that shown, with the spool held to the left in the "brake-off" position by spring 11, port 39 is connected to the pressure source P through port 23, across land 8, through port 20. Thus in that position, chamber 3 would be at the pressure in port 5. When spool 7 is moved to the position shown to apply the trailer brakes (by force F or pressure from E in chamber 21) land 8 closes the connection between P and port 39 and connects that port to the low pressure return 19 across land 9, thus causing pressure to rise in chamber 3 and via orifice 67, conduit 24, check valve 68/30 and conduit 13, in annulus 69. The movement of spool 7 to the position shown causes land 10 to close the connection of the brake line to low pressure return through port 19, the "timing" of the spool lands being such that land 10 closes before land 8 closes and land 9 opens. Pressure in brakes B and port 41 is transmitted to chamber 22 by drillings 12 in spool 7 and that pressure reacts on the area of spool 7 to produce a force balance on the spool, against the input force produced by F, or the pressure in 21. Slight overbalance occurs, land 8 opens and land 9 closes pressurising port 39 and lowering, if the pressure in port 5 is lower, the pressure in chamber 3. Conduit 24 becomes depressurised but check valve 30/68 retains the pressure through to brakes B. Land 10 on spool 7 remains overlapped with the valve body and seals port 41 from the low pressure return line through port 19. Land 27 also remains in an "open" position clear of edge 70.

Pressure in the brakes B is retained until spool 7 is allowed to move to the left, by reducing force F or lowering pressure in 21, sufficiently for land 10 to allow fluid to flow from brakes B to port 19. If pressure in the brakes B does not remain high enough, the force on the spool from F or the pressure in 21 becomes higher than the reaction force on the spool due to the brake pressure and the spool moves right-wards to repeat the sequence of raising pressure in the brakes.

Spool 2 restricts flow between port 1 and port 5, the pressure in port 1 being a function of the pressure in port 5, the spring 6, the pressure in chamber 3 (connected to port 1 via orifice 4) and the reaction forces on spool 2 due to the flow from port 1 to port 5. With low pressure in chamber 3 the pressure difference between port 1 and port 5 is a minimum (minimised by careful design to reduce parasitic losses in the system) and restricting the flow out of chamber 3 causes the pressure to rise and causes spool 2 to move to the right to restrict flow between ports 1 and 5 thus increasing the pressure difference between them. The switch action of the pilot operated check valve minimises metering effects and gives a rapid rate of pressure rise in chamber 3 even when the size of orifice 4 is minimised.

If pressure in port 5, reflected in chamber 3 is below the braking pressure required when the valve is operated the braking pressure is controlled by lands 8 and 9 operating on pilot check valve 34, 35 (to reduce pressure in chamber 3) when the forces on spool 7 balance. The check valve 30/68 retains pressure in the braking circuits. If pressure in port 5 and reflected in chamber 3, is higher than the braking pressure required, then lands 8 and 9 controlling the pilot operated check valve 34/35 do not affect the pressure level in annulus 69 significantly and the closing of land 10 and opening of land 27 control the pressure in the brakes, spool equilibrium occurring when the interaction of the lands creates the required braking pressure level.

The pilot spool 7 operating in the manner described controls the braking pressure by means of loading and unloading the main pressure supply circuit or by reducing and controlling that circuit pressure. The braking pressure level is determined, in either mode, by the pressure in chamber 21 and the effective area of piston 26 or by that and the force F or by the force F alone. To avoid excessive pressure levels in the braking circuit a pre-loaded spring is interposed between piston 26 and spool 7. Housing 63 slides in body 72 and constrains spring 66 within it, plate 64 being restrained by clip 65. The rightwards travel of housing 63 is limited by face 71 and any excess input force maintains that contact and does not transfer to spool 7. The pre-load in spring 66 is arranged to limit the force on spool 7 thus controlling the maximum pressure in the brake circuit port 41.

The purpose of orifice 67 is to limit the flow into the braking circuit and to limit the pressure rise at pump P. The pressure level in the braking circuit is reflected at conduit 24 when fluid is flowing into the brake and is sensed in chamber 3 through orifice 4. Pressure in port 1 is related to the pressure in chamber 3 as previously described.

A nominally constant pressure differential is maintained between port 1 and chamber 3 of, say, 3 bar.

In the foregoing description fluid taken to chamber 3 via orifice 4 is returned to chamber 5 through the controlling pilot operated check valve. Thus fluid is returned to the system and a more or less constant pressure differential maintained between ports 1 and port 5.

It is also possible to allow the fluid passing through 4 to flow into the low pressure return port 19, thus losing that small flow from the system. The effect is to reduce, and make less constant, the pressure differential between port 1 and port 5.

The check valves shown in the diagrams are of the ball type but may be cone shuttles or discs and one may be of one form and one another.

Plunger 25 allows manual operation of spool 7 and the area of the protruding part of the plunger may be chosen to suit the requirements of the operator if and when pressure is applied at the same time from E via chamber 21.

Figure 7:
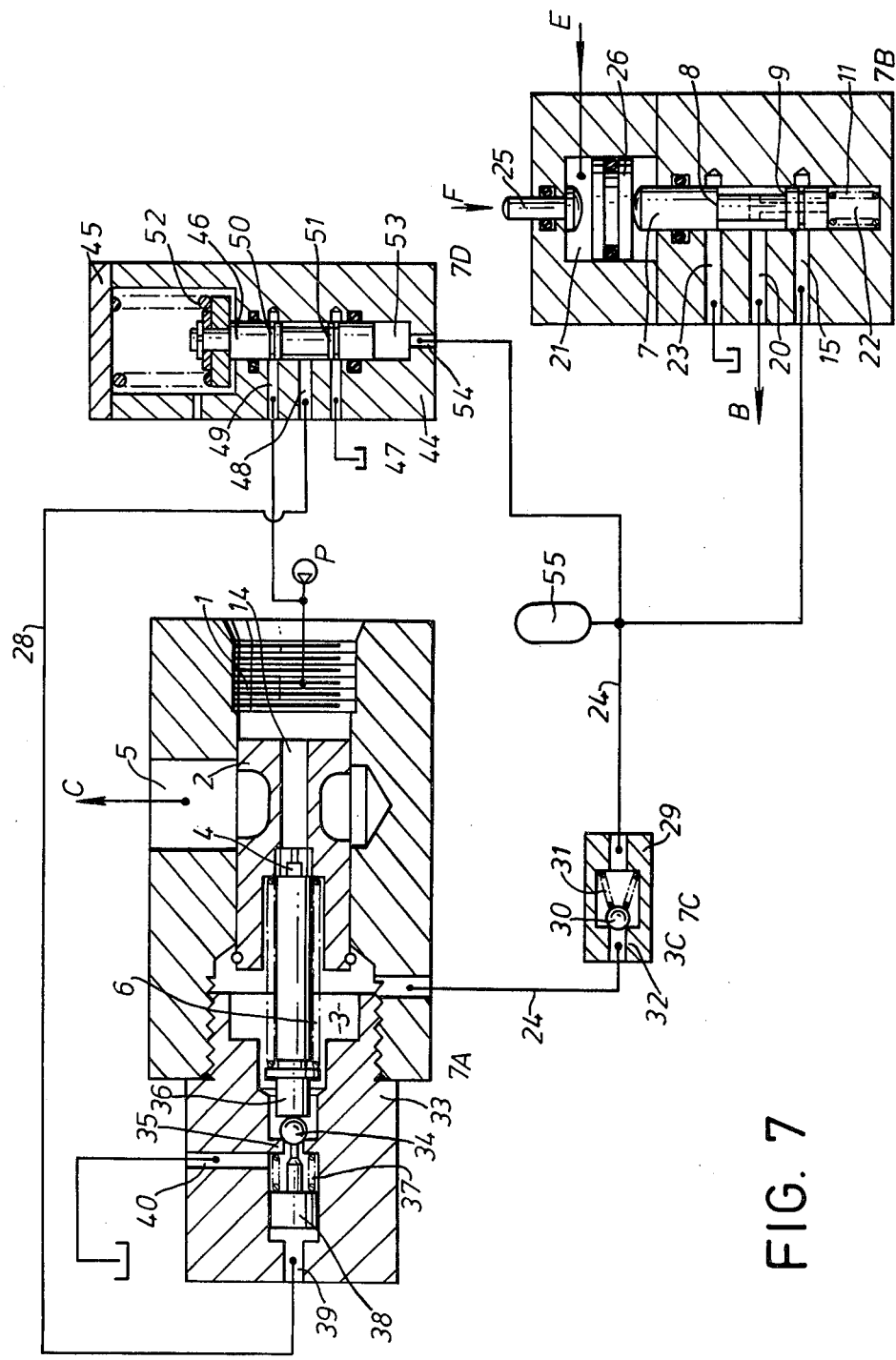
FIG. 7 is a diagram of a constant pressure hydraulic braking system including a control valve (7A) and a pilot valve (7B)
Figure 8:
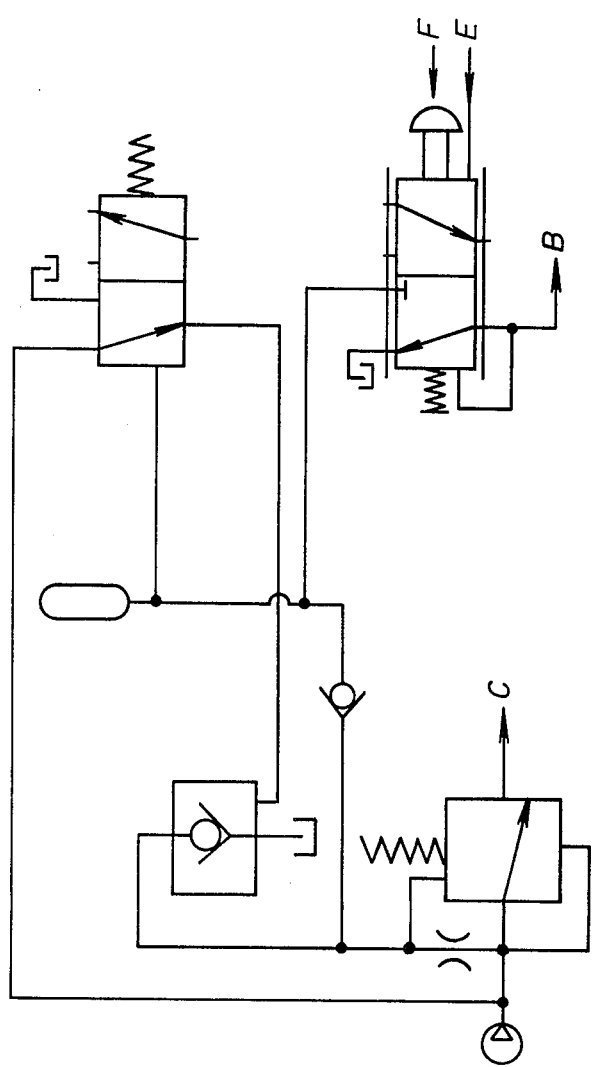
FIG. 8 is a hydraulic circuit diagram of the system shown in FIG. 7.

FIGS. 7 and 8 show a constant pressure system having pressure control valve 7A, Pilot unloading valve 7D, pilot control valve 7B, a check valve 7C and an accumulator 55. In this system, there are flow losses by leakage of the low pressure return.

The pressure control valve assembly 7A functions as the similar control valves described above and pilot valve 7D switches the pilot operated check valve. The position of spool 46 is controlled by pressure in accumulator 55 balancing an equivalent pressure derived from spring 52.

The lands 50 and 51 are so arranged as to overlap ports 49 and 47 to provide a suitable pressure differential between maximum and minimum pressure in accumulator 55. Check valve 7C avoids flow from accumulator 55 to chamber 3 and accumulator pressure is sensed in chamber 53 via port 54 without absorbing measurable flow. Flow from the accumulator can occur through pilot valve 7B, as leakage across land 9 to low pressure return via land 8 and port 23 or as flow to pressurise the brakes B by operation of the valve.

Force applied at F or pressure in chamber 21 from the tractor braking circuit E moves spool 7 downwards to close the flow path at land 8 and open that at land 9 allowing flow from accumulator 55 into the brakes at B. Brake pressure in port 20, transmitted to chamber 22 via drillings 12 rises until spool 7 is in equilibrium due to the force derived from pressure in chamber 22 acting on the area of spool 7 balancing the applied downward force, at that point flow to brakes B is cut off by land 9. When the input force is removed from spool 7, spring 11 urges it upwards and opens the brakes to low pressure return via land 8 and port 23. The valve is arranged so that the brake pressure can be adjusted continuously by varying the input force as lands 8 or 9 open and close to reduce or raise pressure. The valve operation remains stable because the level of restriction to transient flow in drillings 12 can be adjusted to assist in the control of stability.

The maximum pressure available to brakes B is the maximum pressure attained by the accumulator 55 which is controlled by the spring setting of 7D and it can be any pressure below the relief valve setting for source P.

Flow loss occurs when ball 34 is held off of its seat 35 by piston 38, that is when chamber 3 is at return line pressure and valve 7D senses that the accumulator 55 is at the required maximum pressure. The amount of flow lost depends upon the size of orifice 4 and the upstream pressure P. Orifice 4 is sized to minimise the losses but to allow sufficient flow to charge accumulator 55 in a reasonable time.

Figure 9:
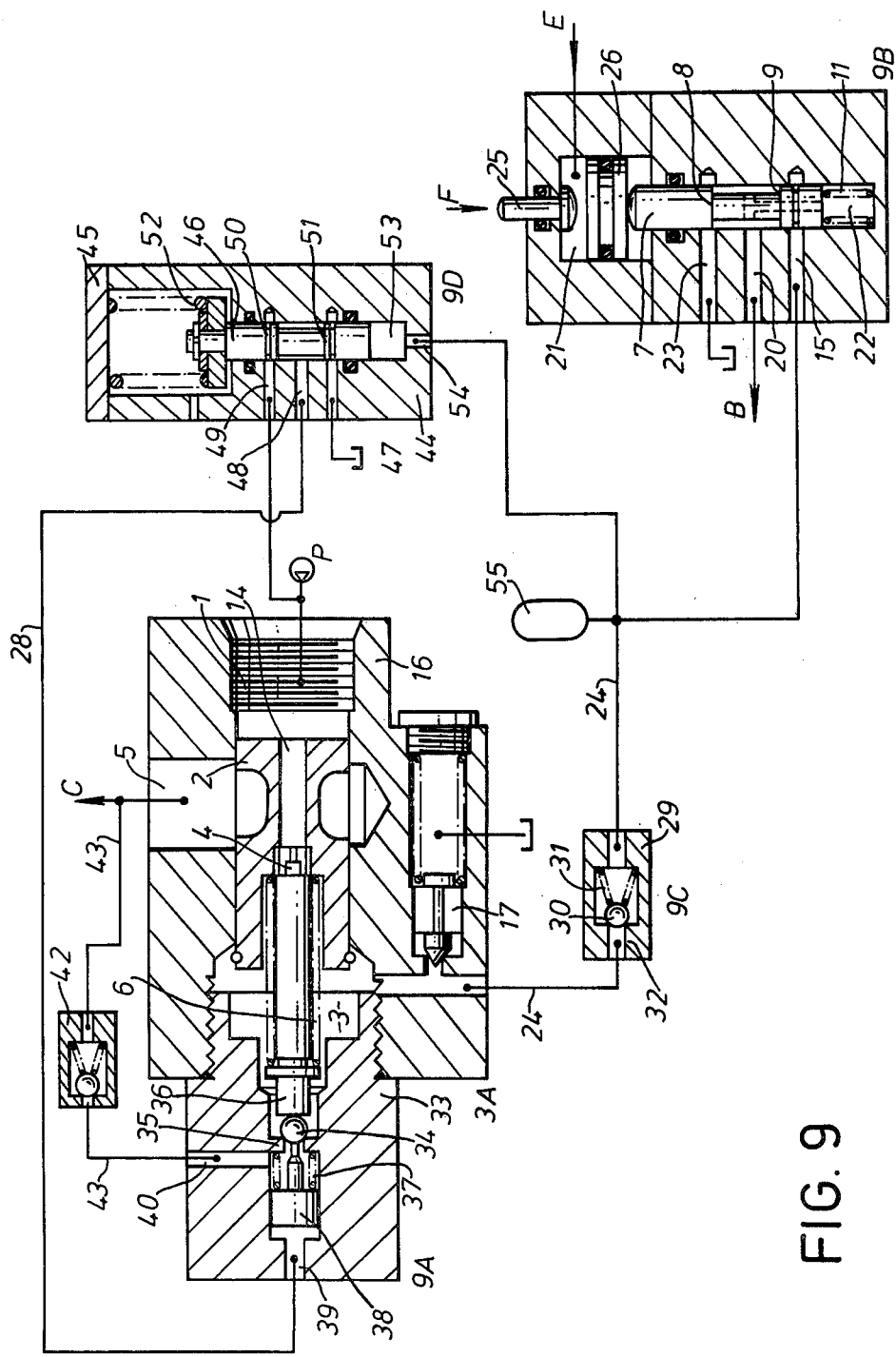
FIGS. 9 and 10 are similar to FIGS. 7 and 8 but for a constant pressure hydraulic braking system without losses.
Figure 10:
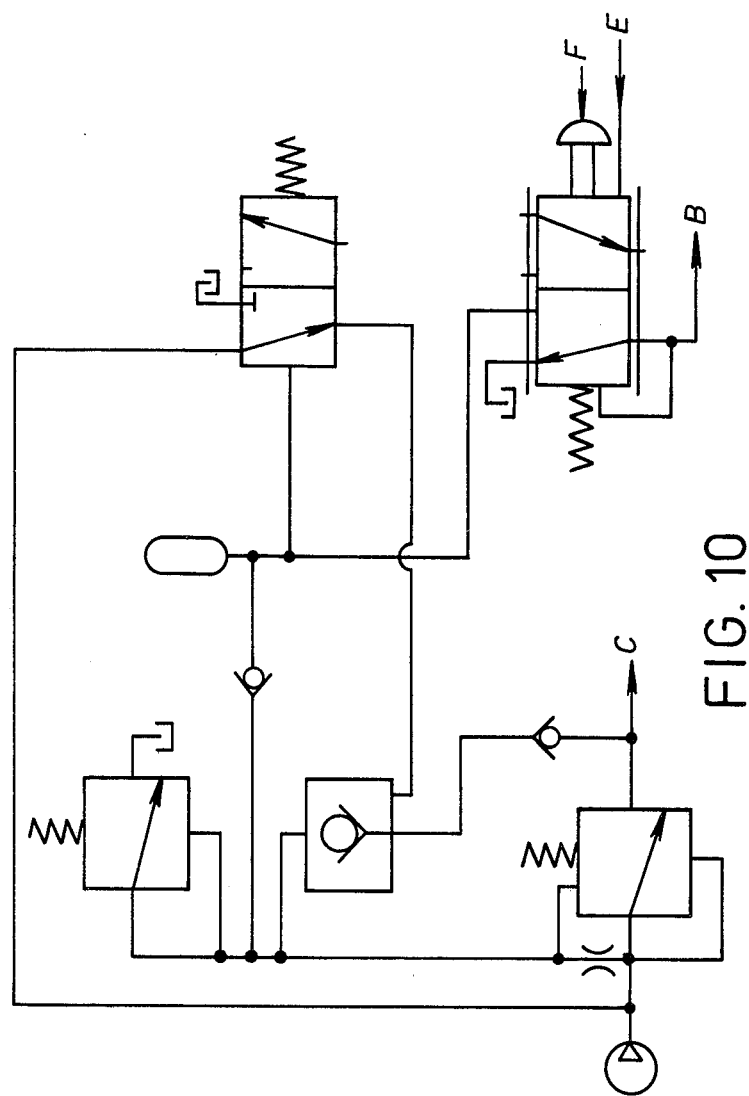

A similar system but without flow losses is shown in FIG. 9. In this system the pressure control valve 9A is modified to include poppet 17 loaded by spring 56. Poppet 17 limits the pressure in chamber 3 by allowing flow to the low pressure return when the pressure in that chamber is sufficient to lift 17 from its seat against the force in spring 56.

The purpose of the modification is to limit pressure in chamber 3 when the outlet of the pilot controlled check valve, port 40 is connected to port 5, that connection avoiding the loss of that flow.

The system functions as the system described with reference to FIGS. 7 and 8, except that the pressure in chamber 3 follows the pressure at C (in port 5) thus unless that pressure is limited by the poppet valve 17 the accumulator pressure may be higher than desired. The setting of pilot valve 9D would only serve to limit the pressure in accumulator 55 if the pressure at C (port 5) was below that set level. A non-return check valve is included in line 43 to avoid flow from port 5 to port 40 to restrict the flow through poppet valve 17 to that passing through orifice 4.

Check valve 9C performs the function of stopping flow from accumulator 55 back to chamber 3.

Figure 11:
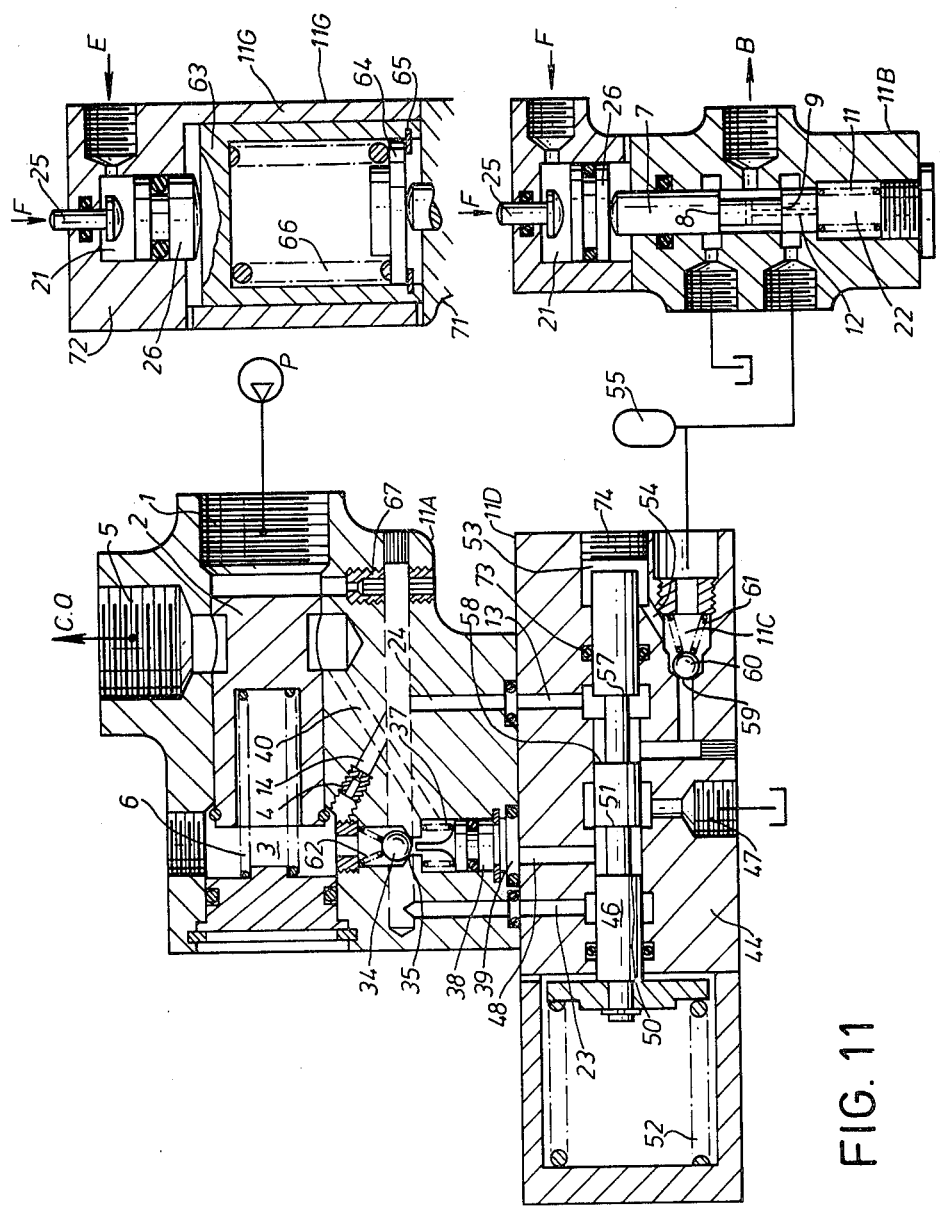
FIG. 11 is a diagram of a preferred embodiment of a constant pressure hydraulic braking system in which there are no flow losses.
Figure 12:
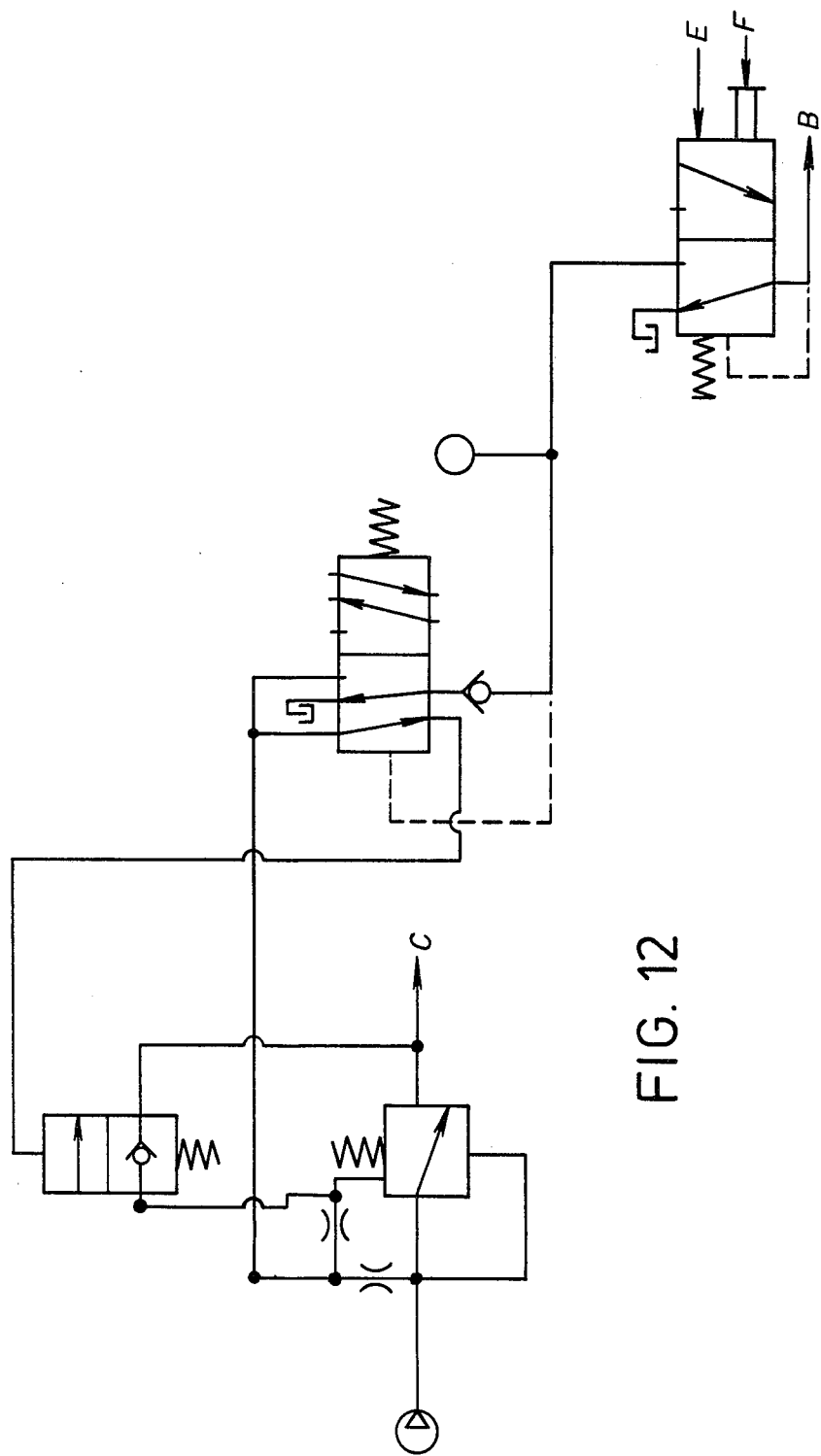
FIG. 12 is a hydraulic circuit diagram of the system of FIG. 11.

In the preferred embodiment of hydrauling braking system of FIGS. 11 and 12, pilot control valve 11B functions to raise and control braking pressure at B when force applied at F or pressure raised in chamber 21 from the tractor braking circuit E, moves spool 7 downwards to close the flow path at land 8 and open that at land 9, allowing flow from accumulator 55 into the brakes at B. Brake pressure in port 20, transmitted to chamber 22 via drillings 12 rises until spool 7 is in equilibrium due to the force derived from pressure in chamber 22 acting on the area of spool 7 balancing the applied downward force, at that point flow to brakes B is cut off by land 9. When the input force is removed from spool 7, spring 11 urges it upwards and opens the brakes B to low pressure return via land 8 and port 23.

The valve is arranged so that the brake pressure can be adjusted continuously by varying the input force, as lands 8 or 9 open and close to reduce or raise pressure. The valve operation remains stable, the level of restriction to transient flow in drillings 12 is adjusted to control the stability of the valve.

The maximum pressure available to brakes B is the maximum pressure attained by the accumulator 55 which is controlled by pressure control valve 11A and the pilot valve 11B and it can be any pressure up to the relief valve setting for source P. Alternatively (see inset FIG. 11) a predetermined maximum braking pressure may be ensured by interposing a preloaded spring between piston 26 and spool 7. Housing 63 slides in body 72 and constrains spring 66 within it, plate 64 being restrained by clip 65. The travel of housing 63 is limited by face 71 and any excess input force maintains the contact and does not transfer to spool 7. The pre-load in spring 66 is arranged to limit the force on spool 7 thus controlling the maximum pressure in the brake circuit port 20.

In the operation of valves 11A, 11C and 11D fluid is supplied from source P, to port 1 and acts upon spool 2 tending to move it to the left so allowing the fluid to flow out through port 5 as indicated by arrow C. Part of the flow entering at 1 passes through orifice 67 and thence through orifice 4 into chamber 3 and the pressure in port 1 is proportional to the pressure in that chamber. If fluid cannot escape from chamber 3 spool 2 cannot move to the left and the pressure in port 1 rises to the relief pressure of the source P. The line 24 connects the downstream side of orifice 67 to the pilot valve 11 C through port 13. Chamber 3 can also be connected to port 5 through a pilot operated check valve and conduit 40, the action of the pilot operated check valve is controlled by lands 50 and 51 of the pilot valve. Ball 34 seals on seat 35 urged by spring 62 and the pressure differential between chamber 3 and port 5.

To lift ball 34 from seat 35, to equate the pressure in chamber 3 to the pressure in chamber 5, plunger and piston 38 is moved to push ball 34 against spring 62 and chamber 3 is then connected to port 5. Plunger 38 is moved by pressurising port 39 to a level approximately equal to the pressure in port 1, the area presented by plunger 38 to pressure in port 39 is greater than the area of seat 35 by an amount sufficient to ensure that ball 34 is always moved away from seat 35. Pressure in port 39 is controlled by spool 46 of the pilot valve. In the opposite position to that shown, with the spool 46 held to the left in the "fully charged" position by accumulator pressure in chamber 53 port 39 is connected to the pressure source P through port 23, across land 50, through port 48. Thus in that position, chamber 3 would be at the pressure in port 5. When spool 46 is moved to the position shown, to charge the accumulator 55, (by urging of spring 52) land 50 closes the connection between P and port 39 and land 51 connects that port to the low pressure return 47, thus causing pressure to rise in chamber 3 and in port 1 and fluid to flow across land 57 to charge accumulator 55, the movement of spool 46 to the position shown having caused land 58 to close the connection of the accumulator line to low pressure return through port 47, the "timing" of the spool lands being such that land 58 closes before land 51 opens. Pressure in accumulator 55 is transmitted to chamber 53 by drilling 54 and that pressure reacts on the area of spool 46 to produce a force balance on the spool, against the force produced by the spring 52. The pressure differential between maximum accumulator pressure and the recharge threshold pressure level is determined by the overlap of lands 50 and 51 in the body of 11D and the "rate" of spring 52. Pressure rises in accumulator 55 and hence in chamber 53 spool 46 moves to the left. Land 51 closes the connecting path of chamber 39 to port 47 but land 50 remains over-lapped with the body of 11D and effectively seals chamber 39 against the pressure in 23. The accumulator 55 continues to receive fluid and the pressure rises until land 50 admits sufficient fluid into chamber 39 to cause piston 38 to lift ball 34 from seat 35 and causes the pressure in port 1 to drop in the manner previously described. Flow into accumulator 55 ceases and non-return valve 11C, consisting ball 60 urged onto seat 59 by spring 61, retains the pressure in the accumulator. Chamber 53, also connected to the accumulator, is sealed by plug 74 and seal 73 on spool 46. Leakage from the accumulator is minimised in the "brakes-off" state, by the close fit and overlap of land 9 on spool 7.

When fluid is taken from the accumulator the dropping pressure level in the accumulator and hence in chamber 53 allows springs 52 to move spool 46 to the right, closing land 50 but retaining pressure in chamber 39 until land 51 opens. Thus the pressure differential is maintained before the charging procedure is repeated.

In the foregoing description fluid taken to chamber 3 via orifice 4 is returned to chamber 5 through the controlling pilot operated check valve. Thus fluid is returned to the system and a more or less constant pressure differential maintained between port 1 and port 5.

It is also possible to allow the fluid passing through orifice 4 to flow into the low pressure return port 47, thus losing that small flow from the system. The effect is to reduce, and make less constant, the pressure differential between port 1 and port 5.

As for the previous case the check valves shown in the diagrams are of the ball type but may be cone shuttles or discs and one may be one form and one another.

If the pressure in port 5 is higher than the maximum pressure required in the accumulator 55 it is arranged such that, although land 50 would still open to pressurise chamber 39 and thus unseat valve 34, 35 and fluid would still tend to flow into the accumulator, land 57 would close as pressure continued to rise in chamber 53. The movement of spool 46 required to close land 57 being very small, the rise in force from spring 52 would be small, and the accumulator pressure rise also small. Land 58 is "timed" to open as land 57 closes tending to minimise the pressure rise. Thus pressure in the accumulator is limited to a level only lightly above the normal maximum level but well within safety limits.

Plunger 25 allows manual operation of spool 7 and the area of the protruding part of the plunger may be chosen to suit the requirements of the operator if and when pressure is applied at the same time from E via chamber 21.

I claim:

1. A hydraulic braking system for a tractor-trailer combination having a hydraulic pressure source on the tractor, a tractor braking circuit for tractor brakes and a trailer braking circuit for trailer brakes, said trailer braking circuit including a connection to said trailer brakes and a connection to a return line, a pressure control valve connected between said source and said trailer braking circuit and operable to provide hydraulic braking fluid under pressure through a service outlet to said trailer braking circuit, said pressure control valve having a chamber and a restricted bypass connecting said source to said chamber for conveying braking fluid under pressure to said chamber, conduit means connected to an outlet of said chamber for conveying by-passed braking fluid under pressure to said trailer braking circuit, a pilot valve in the trailer braking circuit connected to said conduit means and operable for selectively controlling admission of hydraulic braking fluid under pressure to the trailer brakes or to the return line, a pilot operated check valve disposed at a further outlet for said chamber, means controlled by actuation of said pilot valve for controlling said check valve.

2. The hydraulic braking system defined in claim 1, wherein said pressure control valve contains a spool movable in response to pressure from said source to admit braking fluid under pressure to the trailer braking circuit, and said bypass being a restricted bore in said spool.

3. The hydraulic braking system defined in claim 1, wherein said chamber is in a housing for the pressure control valve and said bypass is a restricted bore through said housing.

4. The hydraulic braking system defined in claim 1, wherein said pressure control valve comprises a movable element exposed at one end to pressure from said source and having its other end exposed to the interior of said chamber.

5. A system according to claim 1 wherein the return line is connected to a low pressure sink.

6. A system according to claim 1 wherein the return line is connected through a check valve to the services outlet port of the pressure control valve.

7. A system according to claim 1 wherein means is provided whereby the pilot operated check valve is biased toward the closed position and means is provided whereby it is also urged toward that closed position by the pressure differential between the source pressure acting via the restricted bore and the return line pressure.

8. A system according to claim 7 and comprising a plunger having an operating piston subject to an operating fluid pressure controlled by means in the pilot valve whereby the pilot valve is adapted to connect the operating piston to the operating fluid pressure except when the pilot valve is operated for trailer braking, and wherein the arrangement of the check valve is such that the resultant force acting thereon when the operating piston is subject to the operating fluid pressure tends to open the check valve.

9. A system according to claim 8 wherein the check valve comprises a ball biased onto an annular seat through which the said plunger travels to engage and displace the ball so opening the valve.

10. A system according to claim 1 wherein the pilot valve is urged by the source pressure towards a position wherein the trailer brakes are connected to the low pressure return line, whereby a lap condition is established such that during braking the trailer brakes are connected to the said low pressure return line when the pressure demanded at the trailer braking circuit and reflected by the source pressure exceeds a predetermined value.

* * * * *